United States Patent
Prakah-Asante et al.

(10) Patent No.: US 11,059,349 B2
(45) Date of Patent: Jul. 13, 2021

(54) ENHANCED CLIMATE CONTROL

(71) Applicant: Ford Global Technologies, LLC, Dearborn, MI (US)

(72) Inventors: Kwaku O. Prakah-Asante, Commerce Township, MI (US); Basavaraj Tonshal, Northville, MI (US); Yifan Chen, Ann Arbor, MI (US); Padma Aiswarya Kolisetty, Chennai (IN); Hsin-hsiang Yang, Ann Arbor, MI (US); Gary Steven Strumolo, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 43 days.

(21) Appl. No.: 15/755,844

(22) PCT Filed: Oct. 16, 2015

(86) PCT No.: PCT/US2015/055894
§ 371 (c)(1),
(2) Date: Feb. 27, 2018

(87) PCT Pub. No.: WO2017/065797
PCT Pub. Date: Apr. 20, 2017

(65) Prior Publication Data
US 2018/0326814 A1    Nov. 15, 2018

(51) Int. Cl.
*B60H 1/00* (2006.01)
*F24F 11/80* (2018.01)
(Continued)

(52) U.S. Cl.
CPC ..... *B60H 1/00742* (2013.01); *B60H 1/00792* (2013.01); *B60H 1/00807* (2013.01);
(Continued)

(58) Field of Classification Search
CPC ............ B60H 1/00742; B60H 1/00792; B60H 1/00807; F24F 11/80; F24F 2120/20; G05D 23/1917
(Continued)

(56) References Cited

U.S. PATENT DOCUMENTS

| | | | |
|---|---|---|---|
| 5,145,112 A | 9/1992 | Ueda | |
| 5,172,856 A * | 12/1992 | Tanaka | B60H 1/00742 236/49.3 |

(Continued)

FOREIGN PATENT DOCUMENTS

| | | |
|---|---|---|
| EP | 2001200 A2 | 12/2008 |
| EP | 2871866 A1 | 5/2015 |

(Continued)

OTHER PUBLICATIONS

Wei et al., "An intelligent automotive climate control system", IEEE Xplore, Copyright 2011 IEEE.
(Continued)

*Primary Examiner* — Tho V Duong
*Assistant Examiner* — Raheena R Malik
(74) *Attorney, Agent, or Firm* — Brandon Hicks; Bejin Bieneman PLC

(57) ABSTRACT

Data about a skin response characteristic are collected from a vehicle occupant. A target cabin temperature is determined based on the skin data. A climate control system is adjusted based on the target cabin temperature.

15 Claims, 3 Drawing Sheets

(51) Int. Cl.
    *G05D 23/19*       (2006.01)
    *F24F 120/20*     (2018.01)

(52) U.S. Cl.
    CPC .......... *F24F 11/80* (2018.01); *G05D 23/1917* (2013.01); *F24F 2120/20* (2018.01)

(58) Field of Classification Search
    USPC ........................................................ 165/202
    See application file for complete search history.

(56) References Cited

U.S. PATENT DOCUMENTS

| | | | |
|---|---|---|---|
| 5,187,943 A * | 2/1993 | Taniguchi | B60H 1/00742 62/180 |
| 5,400,964 A | 3/1995 | Freiberger | |
| 6,659,358 B2 | 12/2003 | Kamiya et al. | |
| 7,188,668 B2 | 3/2007 | Hara et al. | |
| 7,246,656 B2 | 7/2007 | Ichishi et al. | |
| 7,918,100 B2 | 4/2011 | Breed et al. | |
| 8,663,106 B2 | 3/2014 | Stivoric et al. | |
| 2011/0224875 A1* | 9/2011 | Cuddihy | B60K 28/06 701/42 |
| 2011/0272131 A1 | 11/2011 | Mikat | |
| 2013/0124038 A1 | 5/2013 | Naboulsi | |
| 2013/0255930 A1 | 10/2013 | Prakah-Asante et al. | |
| 2013/0324024 A1 | 12/2013 | Remmers et al. | |
| 2014/0306814 A1* | 10/2014 | Ricci | H04W 4/21 340/425.5 |
| 2015/0039877 A1 | 2/2015 | Hall et al. | |
| 2015/0081169 A1 | 3/2015 | Pisz | |
| 2015/0127215 A1* | 5/2015 | Chatterjee | H04W 4/046 701/36 |
| 2015/0217777 A1 | 8/2015 | Konigsberg | |
| 2016/0016454 A1* | 1/2016 | Yang | B60H 1/00742 701/36 |
| 2016/0107509 A1* | 4/2016 | Kirsch | B60H 1/00742 165/202 |

FOREIGN PATENT DOCUMENTS

| | | |
|---|---|---|
| JP | 06106952 A | 4/1994 |
| JP | 2004330865 A | 11/2004 |
| JP | 2004359130 A | 12/2004 |
| JP | 2006298014 A | 11/2006 |

OTHER PUBLICATIONS

Kumada et al., "Automatic Climate Control for Vehicle by IR (Infrared) Sensor", Science Links Japan, Copyright 2006-2007 Japan Science and Technology Agency.
"Troubleshoot Automatic Climate Control System", Copyright AA1Car.
International Search Report and Written Opinion dated Jan. 8, 2016 re PCT/US2015/055894.
UK Search Report dated Dec. 6, 2019 re Appl. No. GB1807283.5.

* cited by examiner

ENHANCED CLIMATE CONTROL

CROSS-REFERENCE TO RELATED APPLICATION

This patent application is filed under 35 U.S.C. § 371 as a national stage of, and as such claims priority to, International Patent Application No. PCT/US2015/055894, filed on 16 Oct. 2015; the foregoing application is incorporated herein by reference in its entirety.

BACKGROUND

Climate control systems allow vehicle occupants to adjust cabin temperature to their comfort. A feature of such systems may include adjusting the climate control system to meet a target cabin temperature. Current mechanisms to determine the target cabin temperature are not tailored or calibrated to the occupant.

DETAILED DESCRIPTION

Figure 1:
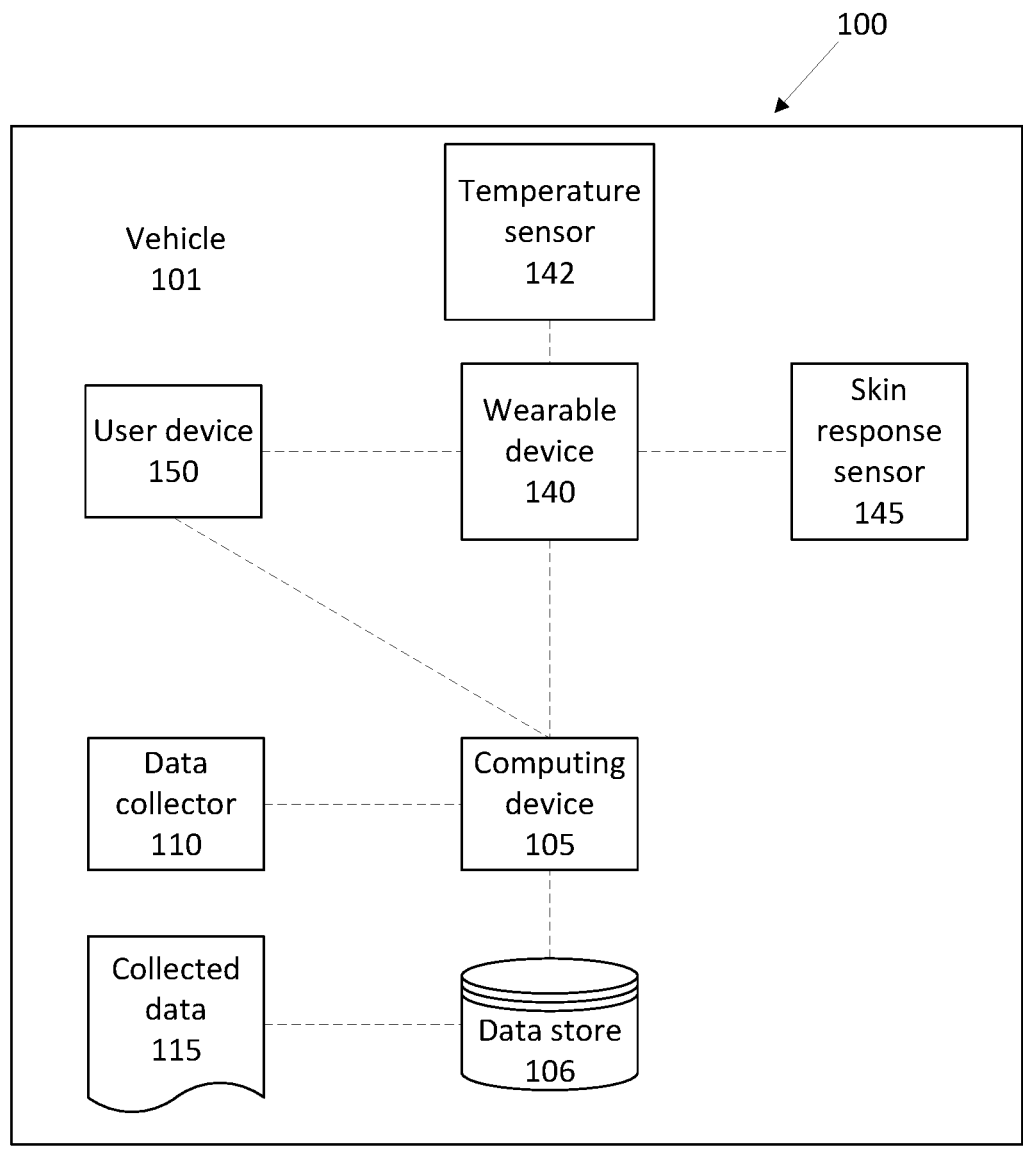
FIG. 1 is a block diagram of an example system including a wearable device providing output indicating a change in vehicle climate control.

FIG. 1 illustrates a system 100 including a wearable device 140 communicatively coupled to a vehicle 101 computing device 105. The computing device 105 is programmed to receive collected data 115 from one or more data collectors 110, e.g., vehicle 101 sensors, concerning various measurements related to the vehicle 101. For example, the measurements may include an ambient cabin temperature, a temperature outside the vehicle 101, biometric data related to a vehicle 101 occupant, e.g., heart rate, respiration, pupil dilation, body temperature, skin temperature, state of consciousness, etc. Further examples of such measurements may include measurements of vehicle systems and components (e.g., a steering system, a powertrain system, a brake system, internal sensing, external sensing, etc.). The computing device 105 may be programmed to collect data 115 from the vehicle 101 in which it is installed, sometimes referred to as a host vehicle 101, and/or may be programmed to collect data 115 about a second vehicle 101, e.g., a target vehicle.

The computing device 105 is generally programmed for communications on a controller area network (CAN) bus or the like. The computing device 105 may also have a connection to an onboard diagnostics connector (OBD-II). Via the CAN bus, OBD-II, and/or other wired or wireless mechanisms, the computing device 105 may transmit messages to various devices in a vehicle and/or receive messages from the various devices, e.g., controllers, actuators, sensors, etc., including data collectors 110. Alternatively or additionally, in cases where the computing device 105 actually comprises multiple devices, the CAN bus or the like may be used for communications between devices represented as the computing device 105 in this disclosure.

The data store 106 may be of any known type, e.g., hard disk drives, solid-state drives, servers, or any volatile or non-volatile media. The data store 106 may store the collected data 115 sent from the data collectors 110.

The computing device 105 may be programmed to control the climate of the vehicle cabin, as is known, the processor storing instructions to determine whether the vehicle 101 ambient cabin temperature differs from a target cabin temperature, e.g., set by an occupant and/or determined by the computer 105 as disclosed herein, and to adjust the cabin temperature to match the target cabin temperature.

Data collectors 110 may include a variety of devices. For example, various controllers in a vehicle may operate as data collectors 110 to provide data 115 via the CAN bus, e.g., data 115 relating to ambient cabin temperature, outdoor temperature, humidity, etc., of any number of vehicles 101. Sensor data collectors 110 could include mechanisms such as RADAR, LIDAR, sonar, thermocouples, thermistors, manometers, hygrometers, etc. sensors that could be deployed to measure climate data in the vehicle 101. Yet other data collectors 110 could include cameras, breathalyzers, skin response sensors, motion detectors, etc., i.e., data collectors 110 to provide data 115 for evaluating a condition or state of a vehicle 101 operator.

Collected data 115 may include a variety of data collected in a vehicle 101. Examples of collected data 115 are provided above, and moreover, data 115 is generally collected using one or more data collectors 110, and may additionally include data calculated therefrom in the computer 105. In general, collected data 115 may include any data that may be gathered by the data collectors 110 and/or computed from such data. The computing device 105 may use the collected data 115 to develop a climate profile for the occupant. The climate profile may incorporate the occupant's climate control habits and characteristics, e.g., age, experience driving, preferred cabin temperature, etc., as well as the collected data 115, e.g., ambient cabin temperature, outdoor temperature, cabin humidity, etc. The climate profile may be used by the computing device 105 to adjust the cabin temperature of the vehicle 101. The computing device 105 may create several climate profiles for different occupants and store them in the data store 106.

The wearable device 140 may be any one of a variety of computing devices including a processor and a memory, as well as communication capabilities that is programmed to be worn on a driver's body. For example, the wearable device 140 may be a watch, a smart watch, a vibrating apparatus, etc. that includes capabilities for wireless communications using IEEE 802.11, Bluetooth, and/or cellular communications protocols.

The wearable device 140 may include a temperature sensor 142. The temperature sensor may be of any known type, e.g., a thermocouple, a thermistor, etc. The temperature sensor 142 measures the skin temperature of the occupant wearing the wearable device 140, and the device 140 sends the skin temperature data 115 to the computing device 105. The wearable device may further include a skin response sensor 145. The skin response sensor 145 measures the electric conductivity of the occupant's skin, i.e., the ability for electricity to conduct across the occupant's skin. For example, dry skin has a much lower electric conductivity than wet skin, so an occupant with sweaty skin (e.g., from a high ambient cabin temperature) would have a higher conductivity. This conductivity increase can be used to signal the computing device 105 to lower the ambient cabin temperature.

The system 100 may include the user device 150. The user device 150 may be any one of a variety of computing devices including a processor and a memory, e.g., a smartphone, a tablet, a personal digital assistant, etc. the user device 150 may communicate with the vehicle computer 105 and the wearable device 140. The user device 150 may include a temperature sensor to determine ambient cabin temperature of the vehicle 101.

Figure 2:
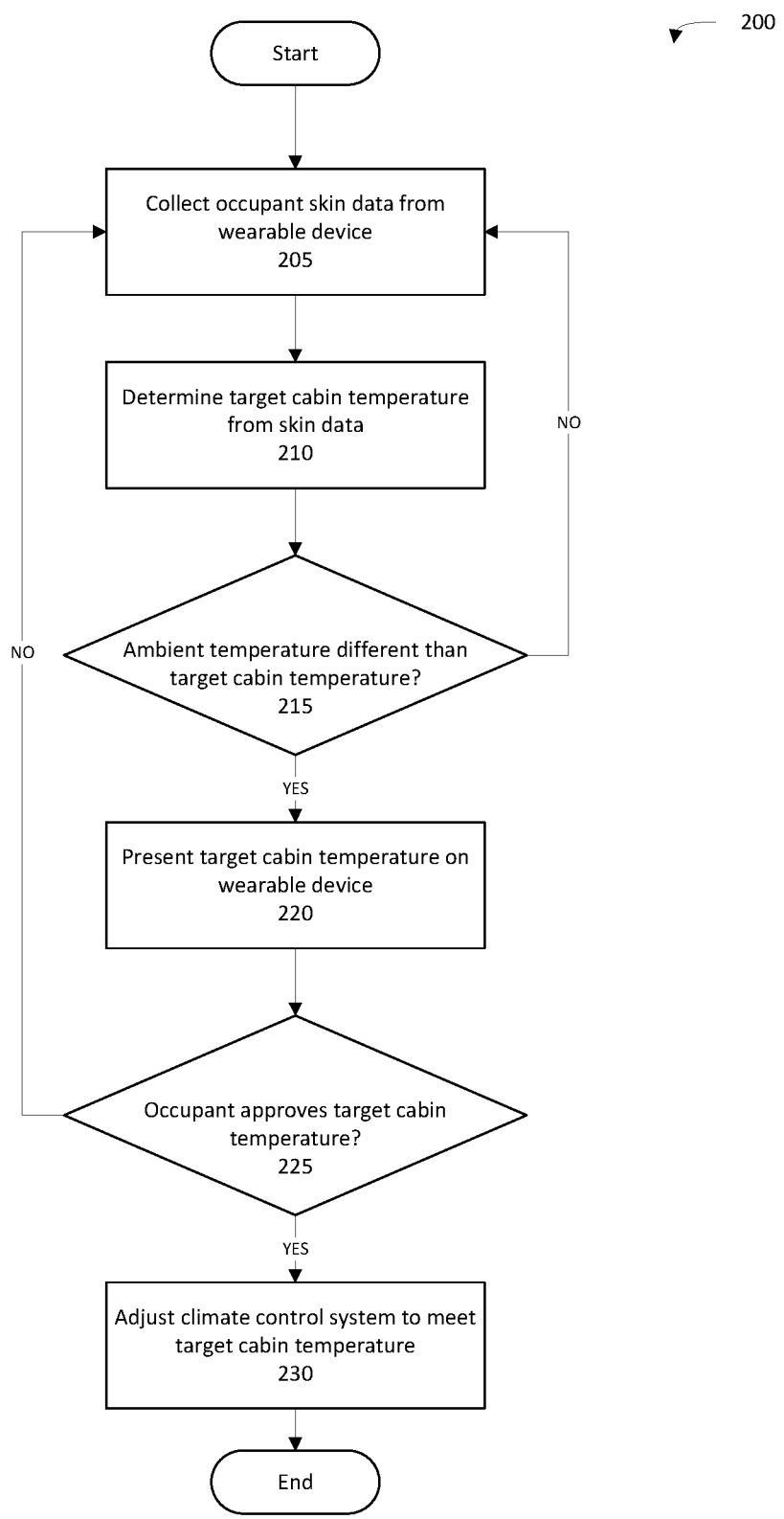
FIG. 2 is a diagram of an example process for adjusting a climate control system.

FIG. 2 is a block diagram of a process 200 for adjusting the computing device 105. The process 200 starts in a block 205 where the computing device 105 collects data on a skin characteristic from the wearable device. The skin characteristic data may include, e.g., skin temperature and/or electric conductivity.

Next, in a block 210, the computing device 105 determines a target cabin temperature based on the skin characteristic data collected in the block 205. The target cabin temperature may be determined by at least one of the processes 300, 350 described in FIGS. 3A and 3B. For example, if the electric conductivity is higher than previous measurements, the occupant may be sweating, and the computing device 105 may determine a target cabin temperature that is a few degrees lower than the present target cabin temperature.

Next, in a block 215, the computing device 105 determines whether the ambient cabin temperature differs from the target cabin temperature. The computing device 105 may collect the ambient cabin temperature from, e.g., a data collector 110, the wearable device 150, and/or the wearable device 140. If the ambient temperature does not differ from the target cabin temperature, the process 200 returns to the block 205 to collect more data. Otherwise, the process continues in a block 220.

In the block 220, the computing device 105 sends the target cabin temperature to the wearable device 140, where the target cabin temperature is presented to the occupant for approval on a wearable device display. The display may include a mechanism for indicating approval, e.g., a physical button and/or a prompt on a touchscreen.

Next, in a block 225, the occupant decides whether to adjust the target cabin temperature to the newly determined target cabin temperature. If the occupant disapproves the new target temperature, the process returns to the block 205 to collect more data. Otherwise, the process continues in a block 230. In some implementations, blocks 220, 225 may be skipped, i.e., the target temperature may be set as described below without occupant approval, after a period of time has elapsed with an occupant providing input to approve or reject a proposed target cabin temperature, or automatically based on the skin temperature and/or conductivity.

In the block 230, the computing device 105 adjust the climate control system to meet the target cabin temperature and the process 200 ends.

Figure 3A:
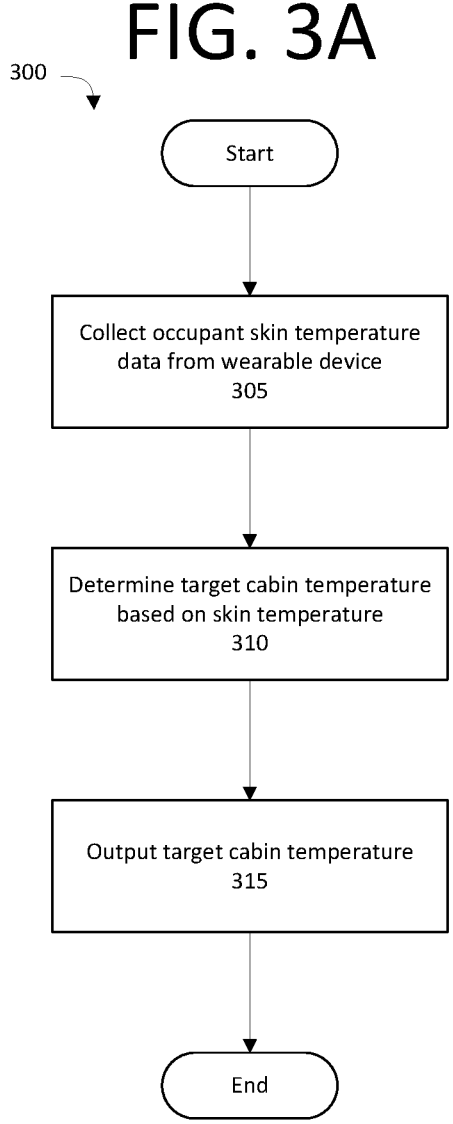
FIG. 3A is a diagram of an example process for determining a target cabin temperature based on an occupant skin temperature.

FIG. 3A illustrates a process 300 for determining a target cabin temperature based on an occupant skin temperature. The process 300 starts in a block 305, in which the temperature sensor 142 collects data on the skin temperature of the occupant. The temperature sensor 142 then sends the temperature data to the user device 150.

Next, in a block 310, the user device 150 determines a target cabin temperature based on the skin temperature data. The skin temperature may be predetermined by the occupant and/or based on a recommended setting based on the occupant's average skin temperature during a period of time, e.g., a driving cycle. The error between the target skin temperature and the measured skin temperature is then used to adjust the target cabin temperature based on rule-based decision making and computation. Decision-making rules to adjust the cabin temperature, for a temperature error, may be determined as follows:

$$T_{err} = TST - MST \quad (1)$$

$$\text{if } T_{err} = x_i, \text{then } TCT = m_i \quad (2)$$

$$\beta \leq TCT \leq \gamma \quad (3)$$

where $T_{err}$ is the error between the target skin temperature TST and the measured skin temperature MST, TCT is the target cabin temperature, and $x_i$, $m_i$ are predetermined values stored, e.g., in the data store 106. The TCT may be bounded between a minimum value $\beta$, e.g., 65 degrees Fahrenheit, and a maximum value $\gamma$, e.g., 75 degrees Fahrenheit.

For example, if the skin temperature data has increased above a set value, the user device 150 may decrease the target cabin temperature to reduce the skin temperature data. Likewise, if the skin temperature data show a decrease in skin temperature below the set value, the user device 150 may increase the target cabin temperature accordingly.

Next, in a block 315, the user device 150 sends the target cabin temperature to the computing device 105, in which the computing device 105 directs the climate control system to meet the target cabin temperature, and the process 300 ends.

Figure 3B:
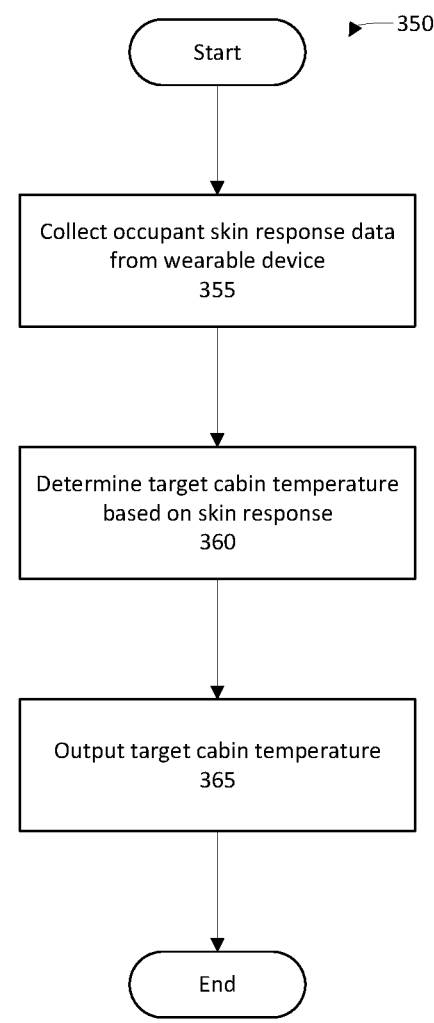
FIG. 3B is a diagram of an example process for determining the target cabin temperature based on an occupant skin electric conductivity.

FIG. 3B illustrates a process 350 for determining a target cabin temperature based on an occupant skin electric conductivity, i.e., galvanic response. The process 350 starts in a block 355, in which the skin response sensor 145 collects occupant skin response data from the occupant. The skin response sensor 145 measures the electric conductivity of the occupant's skin and sends the data collected to the user device 150. The skin conductivity increases as the vehicle occupant sweats. The skin conductivity of the occupant is measured over several periods of time and normalized to a value between 0 and 1, where values closer to 1 indicate higher conductance and values closer to 0 indicate lower conductance.

Next, in a block 360, the user device 150 determines the target cabin temperature based on the skin electric conductivity. A target skin conductivity for a particular target cabin temperature may be determined based on the average skin conductivity of the vehicle 101 occupant as determined over several periods of time. The error between the target skin conductivity and the measured skin conductivity is then used to adjust the target cabin temperature based on rule-based decision making and computation. For example, if the conductivity has increased, the occupant may be sweating, requiring a lower target cabin temperature.

Next, in a block 365, the user device 150 sends the target cabin temperature to the computing device 105, where the computing device 105 directs the climate control system to meet the target cabin temperature, and the process 350 ends.

Both processes 300 and 350 may operate simultaneously to continually update the target cabin temperature used by the computing device 105. For example, the process 350 involving the skin response sensor 145 may operate with faster processing speed relative to the process 300 involving the temperature sensor 142. Thus, the computing device 105 may receive a more responsive target cabin temperature based on whichever process is processed faster. Alternatively, the processes 300, 350 may be performed sequentially.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, sensor measurements, computations, processing time, communications time, etc.

Computing devices 105 generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device 105 is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 200, one or more of the steps could be omitted, or the steps could be executed in a different order than shown in FIG. 2. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:

1. A system, comprising a computer including a processor and a memory, the memory storing instructions executable by the computer to:
    collect data about a skin galvanic response and a skin temperature from a vehicle occupant with a wearable device in contact with skin of the vehicle occupant, the wearable device including a skin galvanic response sensor and a temperature sensor;
    determine an ambient cabin temperature with a temperature sensor in a handheld user device;
    determine a target cabin temperature with the handheld user device based on a most recent measurement of at least one of the skin temperature or the skin galvanic response sent by the wearable device to the handheld user device; and
    adjust a climate control system to adjust the ambient cabin temperature to the target cabin temperature sent by the handheld user device to the computer.

2. The system of claim 1, wherein the skin galvanic response is a measure of electric conductivity of skin.

3. The system of claim 1, wherein the wearable device includes a thermocouple.

4. The system of claim 1, wherein the wearable device includes an electric conductivity sensor.

5. The system of claim 1, wherein the instructions include further instructions to determine the ambient cabin temperature according to data from the wearable device.

6. The system of claim 5, wherein the instructions include instructions to determine a difference between the ambient cabin temperature measured by the wearable device and an ambient cabin temperature measured by the climate control system, wherein the target cabin temperature is determined at least in part by the difference.

7. The system of claim 1, wherein the instructions further include instructions to present the target cabin temperature to the occupant on the wearable device and to adjust the climate control system upon approval of the occupant.

8. A method, comprising:
    collecting data about a skin galvanic response and a skin temperature from a vehicle occupant with a wearable device in contact with skin of the vehicle occupant, the wearable device including a skin galvanic response sensor and a temperature sensor;
    determining an ambient cabin temperature with a temperature sensor in a handheld user device;
    determining a target cabin temperature with the handheld user device, based on a most recent measurement of at least one of the skin temperature or the skin galvanic response sent by the wearable device to the handheld user device; and
    adjusting a climate control system to adjust the ambient cabin temperature to the target cabin temperature sent by the handheld user device to the computer.

9. The method of claim 8, wherein the skin galvanic response is a measure of electric conductivity of skin.

10. The method of claim 8, wherein the wearable device includes a thermocouple.

11. The method of claim 8, wherein the wearable device includes an electric conductivity sensor.

12. The method of claim 8, further comprising determining the ambient cabin temperature according to data from the wearable device.

13. The method of claim 12, wherein the instructions include instructions to determine a difference between the ambient cabin temperature measured by the wearable device and an ambient cabin temperature measured by the climate control system, wherein the target cabin temperature is determined at least in part by the difference.

14. The method of claim 8, further comprising presenting the target cabin temperature to the occupant on the wearable device and to adjust the climate control system upon approval of the occupant.

15. A system, comprising a computer including a processor and a memory, the memory, storing instructions executable by the computer to:
- collect data about a skin galvanic response and a skin temperature from a vehicle occupant with a wearable device in contact with skin of the vehicle occupant, the wearable device including a skin galvanic response sensor and a temperature sensor;
- determine a target cabin temperature based on a most recent measurement of at least one of the skin temperature or the skin galvanic response;
- determine an ambient cabin temperature with a temperature sensor in a handheld user device; and
- adjust a climate control system to adjust the ambient cabin temperature to the target cabin temperature.

\* \* \* \* \*